US012764158B2

(12) United States Patent
Bansal et al.

(10) Patent No.: US 12,764,158 B2
(45) Date of Patent: *Oct. 13, 2026

(54) # SYSTEM AND METHODS OF DEFENSE AGAINST DDoS ATTACKS FOR APPLICATIONS ON A MULTI-SUBSTRATE MULTI-INGRESS SHARED INFRASTRUCTURE

(71) Applicant: Salesforce, Inc., San Francisco, CA (US)

(72) Inventors: Kaushal Bansal, Alamo, CA (US); Prabhat Singh, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/759,047

(22) Filed: Jun. 28, 2024

(65) Prior Publication Data

US 2026/0006068 A1 Jan. 1, 2026

(51) Int. Cl.
*H04L 9/40* (2022.01)

(52) U.S. Cl.
CPC ...... *H04L 63/1458* (2013.01); *H04L 63/1416* (2013.01)

(58) Field of Classification Search
CPC ........................ H04L 63/1458; H04L 63/1416
See application file for complete search history.

(56) References Cited

U.S. PATENT DOCUMENTS 6,789,203 B1 * 9/2004 Belissent .............. H04L 47/193 726/22
7,516,475 B1 4/2009 Chen
9,787,567 B1 * 10/2017 Mehta ..................... H04L 43/06
10,666,680 B2 5/2020 Rodniansky
10,810,233 B2 10/2020 Bansal et al.
(Continued)

FOREIGN PATENT DOCUMENTS

WO 2022060609 A1 3/2022

OTHER PUBLICATIONS

U.S. Appl. No. 18/161,632, Non Final Office Action mailed Mar. 13, 2025, 22 pgs.
(Continued)

*Primary Examiner* — Noura Zoubair
*Assistant Examiner* — Afaq Ali
(74) *Attorney, Agent, or Firm* — Polygon IP, LLP

(57) ABSTRACT

A computer services environment may include web servers providing access domains and a network ingress paths receiving application-layer request messages. The application-layer request messages may each be received from a respective source via a respective ingress path and may be directed to a domain. The computing services environment may also include an orchestration engine configured to determine and implement mitigation policies corresponding with the ingress paths based on a classification of a subset of the plurality of application-layer request messages as being sent from a subset of the sources associated with a distributed denial of service attack. The mitigation policies may include rules to prevent a subset of subsequent application-layer request messages from the subset of the sources from reaching one or more components of the computing services environment.

10 Claims, 11 Drawing Sheets

(56) References Cited

U.S. PATENT DOCUMENTS 11,552,802 B2 1/2023 Bansal et al.
11,790,278 B2 10/2023 Karanth
11,799,901 B2 10/2023 Bansal et al.
11,805,021 B1 10/2023 Bansal et al.
11,893,024 B2 2/2024 Bansal et al.
11,977,476 B2 5/2024 Bansal et al.
11,977,761 B2 5/2024 Bansal
12,069,092 B2 8/2024 Compton
12,124,453 B2 10/2024 Bansal
12,170,688 B1 12/2024 Horelu
2004/0064727 A1 4/2004 Yadav
2011/0035469 A1* 2/2011 Smith ................. H04L 61/4511 709/225
2011/0099622 A1* 4/2011 Lee ..................... H04L 63/1416 726/13
2012/0151593 A1* 6/2012 Kang .................... H04L 43/026 726/25
2012/0174198 A1* 7/2012 Gould ................. H04L 63/0807 726/6
2018/0255094 A1* 9/2018 Doron ................. H04L 63/1416
2019/0188313 A1 6/2019 Bansal
2019/0199746 A1 6/2019 Doron
2019/0230116 A1* 7/2019 Compton ............... G06N 20/00
2020/0067974 A1* 2/2020 Konda .................. H04L 41/145
2020/0177549 A1 6/2020 Barton
2020/0259792 A1 8/2020 Devarajan
2021/0216629 A1* 7/2021 Miller ..................... G06F 21/52
2021/0241047 A1 8/2021 Karanth et al.
2021/0263663 A1 8/2021 Bansal et al.
2022/0060445 A1 2/2022 Kovenat
2022/0086189 A1 3/2022 Nguyen et al.
2022/0086193 A1 3/2022 Nguyen et al.
2022/0103559 A1 3/2022 Weisshaar et al.
2022/0294818 A1 9/2022 Parekh
2023/0039162 A1 2/2023 Salter et al.
2023/0244594 A1 8/2023 Bansal et al.
2023/0259831 A1 8/2023 Karanth et al.
2024/0045990 A1 2/2024 Boyer
2024/0121271 A1 4/2024 Bansal et al.
2024/0195908 A1 6/2024 Bansal et al.
2024/0259186 A1 8/2024 Bansal
2024/0259396 A1 8/2024 Kerkar
2024/0259415 A1 8/2024 Bansal
2024/0259429 A1 8/2024 Monni
2024/0259430 A1 8/2024 P J
2024/0259435 A1 8/2024 Giralte
2024/0289259 A1 8/2024 Bansal
2024/0314175 A1 9/2024 Bansal
2025/0141899 A1 5/2025 Aggarwal
2025/0184247 A1 6/2025 Tulczyjew
2025/0260707 A1* 8/2025 Belgi .................. H04L 63/1433

OTHER PUBLICATIONS

Office Action (Notice of Allowance and Fees Due (PTOL-85)) dated Aug. 11, 2025 for U.S. Appl. No. 18/161,632 (pp. 1-10).
Office Action (Non-Final Rejection) dated Jan. 12, 2026 for U.S. Appl. No. 18/896,115 (pp. 1-39).
Office Action (Non-Final Rejection) dated Apr. 7, 2026 for U.S. Appl. No. 18/989,305 (pp. 1-49).
Office Action (Notice of Allowance and Fees Due (PTOL-85)) dated Mar. 25, 2026 for U.S. Appl. No. 18/896,115 (pp. 1-20).
Office Action dated Jan. 12, 2026 for U.S. Appl. No. 18/896,115 (pp. 1-39).

* cited by examiner

SYSTEM AND METHODS OF DEFENSE AGAINST DDoS ATTACKS FOR APPLICATIONS ON A MULTI-SUBSTRATE MULTI-INGRESS SHARED INFRASTRUCTURE

FIELD OF TECHNOLOGY

This patent application relates generally to network attack detection and mitigation, and more specifically to application layer defense of a shared infrastructure against a distributed denial of service attack.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks. For example, users may interact with website hosting services implemented in cloud comp environments to access website. Such interactions may be conducted via any of various types of devices, such as mobile devices and/or computer systems. Given the prevalence of application layer Distributed Denial of Service (DDoS) attacks, improved techniques for detecting and mitigating DDoS attacks with database systems are desired.

BRIEF DESCRIPTION OF THE DRAWINGS

The included drawings are for illustrative purposes and serve only to provide examples of possible structures and operations for the disclosed inventive systems, apparatus, methods, and computer program products for application layer detection and mitigation of a distributed denial of service attack on a shared infrastructure. These drawings in no way limit any changes in form and detail that may be made by one skilled in the art without departing from the spirit and scope of the disclosed implementations.

DETAILED DESCRIPTION

Figure 1:
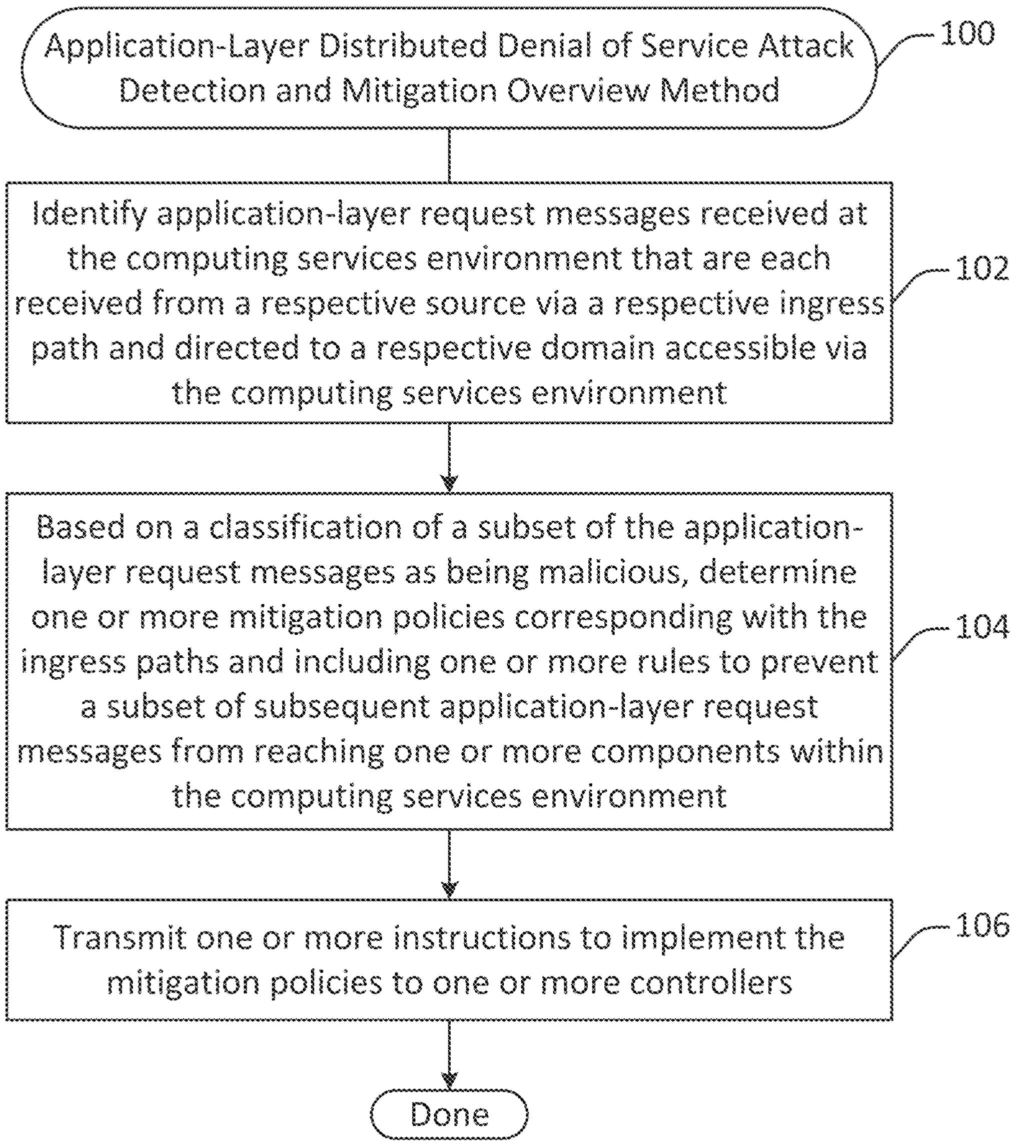
FIG. 1 illustrates an overview method for application-layer distributed denial of service attack detection and mitigation, performed in accordance with one or more embodiments.

Techniques and mechanisms described herein provide for an application-layer DDoS attack detection and mitigation system for a shared infrastructure. A DDoS attack disrupts the availability and resources available to endpoints. To address this problem, techniques and mechanisms describe herein provide for detecting the attack and then determining and implementing an appropriate mitigation policy across potentially multiple ingress paths to the shared infrastructure. The system may determine the severity of the attack based on the traffic spike using historical data. The system may also use one or more artificial intelligence models throughout the detection and mitigation phases of the system to improve the confidence in its suggestions.

In today's cybersecurity landscape, the increasing frequency and complexity of Layer 7 Distributed Denial of Service (L7 DDoS) attacks demand advanced defensive strategies. Layer 7 refers to the top layer in the 7-layer Open Systems Interconnection (OSI) Model of the Internet. It is also known as the "application layer." Layer 7 is the top layer of the data processing that occurs just below the surface or behind the scenes of software applications. For example, login requests, HTTP requests and responses used to load webpages, and other such high-level messages are layer 7 events. An L7 DDoS attack is a strategy that involves sending many malicious application-layer requests in an effort to overwhelm recipient web servers and undermine the services that they provide.

L7 DDoS attacks are particularly challenging to address because responding to an application layer message typically requires many more resources than transmitting an application layer request. For example, sending a login request or a webpage request typically involves few resources and limited network traffic, while operations such as processing a login request, generating a webpage, and sending a webpage typically involve many more processing and network resources. This discrepancy in resource utilization also makes L7 DDoS attacks are particularly attractive to attackers.

Attacks targeting the application layer significantly jeopardize the continuity and reliability of services and infrastructure. Conventional solutions often rely on manual intervention, where engineers review attack event data and correlate it with historical trends and data to distinguish genuine traffic increases from malicious L7 DDoS activities. The overall handling of an incident requires additional steps that again heavily lean on human intervention. These manual methods are not only prone to errors but also demand substantial time and resources. For example, the process of addressing these incidents requires the coordination of multiple teams across incident response bridges, significantly increasing the operational costs associated with detection and remediation. More critically, these incidents can have a profound impact on business operations and erode customer trust, posing substantial risks to long-term business sustainability and customer relationships.

Conventional approaches for addressing L7 DDoS attacks suffer from various deficiencies. For example, rate limiting-based solution for limiting attack traffic, such as Ngnix, typically do not differentiate the benign traffic or attack traffic during rate limiting and require significant manual configuration. For a deployment where hundreds of thousands of domains are hosted, using such a solution is impractical and due to the significant manual intervention needed, which would lead delays in detection and require significant resources. As another example, conventional public cloud DDoS solutions typically do not support specific policies for traffic directed to particular domains and do not support precise detection and mitigation actions. Such limitations again make these solutions ineffective and require significant manual intervention. Commercial DDoS solutions often rely on limited, current traffic data to make decisions and have high chances of false positives and disrupting benign customer traffic during the attack.

To address such challenges, techniques and mechanisms described herein provide for a robust system capable of swiftly detecting, evaluating, and countering L7 DDoS threats with minimal manual input. Automated and intelligent decision-making is harnessed to enhance accuracy, reduce response times, and lower the reliance on extensive human involvement in the threat mitigation process. The system directly addresses the rising frequency and complexity of Layer 7 Distributed Denial of Service (L7 DDoS) attacks. Unlike conventional solutions that depend heavily on manual intervention and retrospective analysis-approaches that are not only time-consuming and resource-intensive but also prone to inaccuracies-techniques and mechanisms described herein provide for automated detection, evaluation, and mitigation of L7 DDoS threats. By integrating intelligent decision-making algorithms that analyze real-time traffic and historical data, the system can swiftly distinguish between legitimate traffic surges and potential DDoS activities. Furthermore, the system's capacity to autonomously implement countermeasures significantly reduces the incident response time, reducing the risk to service continuity and infrastructure reliability. Thus, techniques and mechanisms described herein improve the functioning of cloud computing platforms, reduce the operational burden on cybersecurity teams, enhance the accuracy of threat detection and mitigation, and preserve the integrity of digital services against the backdrop of an evolving threat landscape.

In some embodiments, techniques and mechanisms described herein provide for automated mitigation strategy formulation and implementation. The system can not only identify and evaluate threats but also autonomously formulate and execute mitigation strategies. Such strategies may involve includes dynamic adjustments to traffic handling and rate limiting based on the nature of the detected threat, without requiring manual intervention.

In some embodiments, techniques and mechanisms described herein provide for IP reputation assessment and heuristic analysis. Incorporating IP reputation data and heuristic analysis for evaluating the threat level of incoming traffic adds a layer of sophistication, enabling the framework to more effectively identify and prioritize threats based on their origin and behavior patterns.

In some embodiments, techniques and mechanisms described herein provide post-mitigation analysis and reporting. After action is taken, the system may automatically generate one or more comprehensive reports detailing the attack, the response actions taken, and/or recommendations for future improvements. Such an approach helps to provide for future learning and system enhancement without manual data compilation and analysis.

In some embodiments, techniques and mechanisms described herein facilitate attack detection and mitigation with minimal manual oversight. By significantly reducing the need for human intervention in the detection, analysis, and mitigation processes, the system offers a cost-effective, efficient, and less error-prone alternative to conventional solutions that depend heavily on cybersecurity teams.

In some embodiments, techniques and mechanisms described herein provide for an adaptive and scalable architecture. The system can adapt to evolving threats and scale as necessary to handle varying levels of traffic and attack intensity, providing flexibility and robustness unmatched by more static or manual solutions.

Consider the example of John, an IT professional at a cloud computing service provider providing computing services to various entities via the Internet. John is responsible for ensuring the robustness and security of the institution's digital infrastructure. One of his critical tasks is detecting and mitigating Layer 7 (L7) application layer DDoS attacks, which target the application layer to disrupt services by overwhelming them with malicious traffic. When using conventional approaches, John's efforts are complicated by the shared nature of the cloud computing provider's infrastructure. For instance, a DDoS attack may target only a single entity via a few ingress paths but may negatively affect services to multiple entities across the platform. Accordingly, John's efforts require significant manual intervention and risk negatively affecting the service of entities on the platform other than the targeted entity.

In contrast to conventional techniques, techniques and mechanisms described herein provide for an advanced L7 DDoS attack detection and mitigation system to streamline John's efforts. This system utilizes machine learning algorithms to analyze traffic patterns in real-time, distinguishing between legitimate user activity and potential threats. By providing detailed analytics and automated responses, the system allows John to swiftly identify and block malicious traffic without affecting access by legitimate users. The ability to configure specific thresholds and adaptive learning models means that the mitigation strategies evolve alongside emerging threats, significantly reducing downtime and enhancing the user experience. With this sophisticated tool, John can proactively protect the shared infrastructure from complex DDoS attacks, ensuring continuous service availability and strengthening the overall security posture.

FIG. 1 illustrates an overview method 100 for application-layer distributed denial of service attack detection and mitigation, performed in accordance with one or more embodiments. According to various embodiments, the method 100 may be performed at a computing services environment such as the computing services environment 200 shown in FIG. 2. DDoS attacks may take place in a variety of ways including, and not limited to, spurious requests sent via a one or more client machines to one or more domains via one or more communication channels during one or more time-ranges.

Application-layer request messages received at the computing services environment are identified at 102. The request messages are each received from a respective source via a respective ingress path and directed to a respective domain accessible via the computing services environment.

In some embodiments, a given request message may be non-malicious. For example, a user may be attempting to log into their corporate email account from their work device. However, some request messages may instead be classified as malicious. For example, one or more client machines may be sending request messages to one or more domains to intentionally erode performance. Additional details regarding the identification of application-layer request messages received at the computing services environment are discussed with respect to the method 300 shown in FIG. 3.

One or more mitigation policies are determined at 104. According to various embodiments, the policies are determined based on a classification of a subset of the application-layer request messages as being malicious. The mitigation policies may correspond with the ingress paths and including one or more rules to prevent a subset of subsequent application-layer request messages from reaching one or more components within the computing service environment. Mitigation policies may be determined by one or more techniques. For example, a determination process may include historical information on a domain endpoint. For another example, the mitigation policy may be determined by evaluating the performance of the selected mitigation policy and determining if modification need to be made. Additional details regarding the mitigation policy determination are discussed with respect to the method 700 shown in FIG. 7.

One or more instructions are transmitted to one or more controllers at 106. According to various embodiments, the instructions contain relevant information for implementing the mitigation policies at the controllers. For example, a mitigation policy that throttles the malicious traffic of a client-machine may instruct the one or more controllers to limit the malicious traffic that is being processed by the edge network. As another example, a mitigation policy may contain instructions to a controller to divert non-malicious traffic to a different webserver. Additional details regarding the implementation of the mitigation policy are discussed with respect to the method 500 shown in FIG. 5.

It should be noted that the method 100, as well as more generally other techniques and mechanisms described herein, may be applied to a portion of a computing services environment rather than to an entire computing services environment. For instance, traffic may be analyzed and attacks may be identified and mitigated on any of various levels. Such levels may include one or more of: one or more domains, one or more application servers, one or more geographic locations, one or more service types, one or more service recipients, one or more network ingress paths, one or more traffic sources, and/or any other element through which a computing services environment interacts with external machines to provide computing services.

Figure 2:
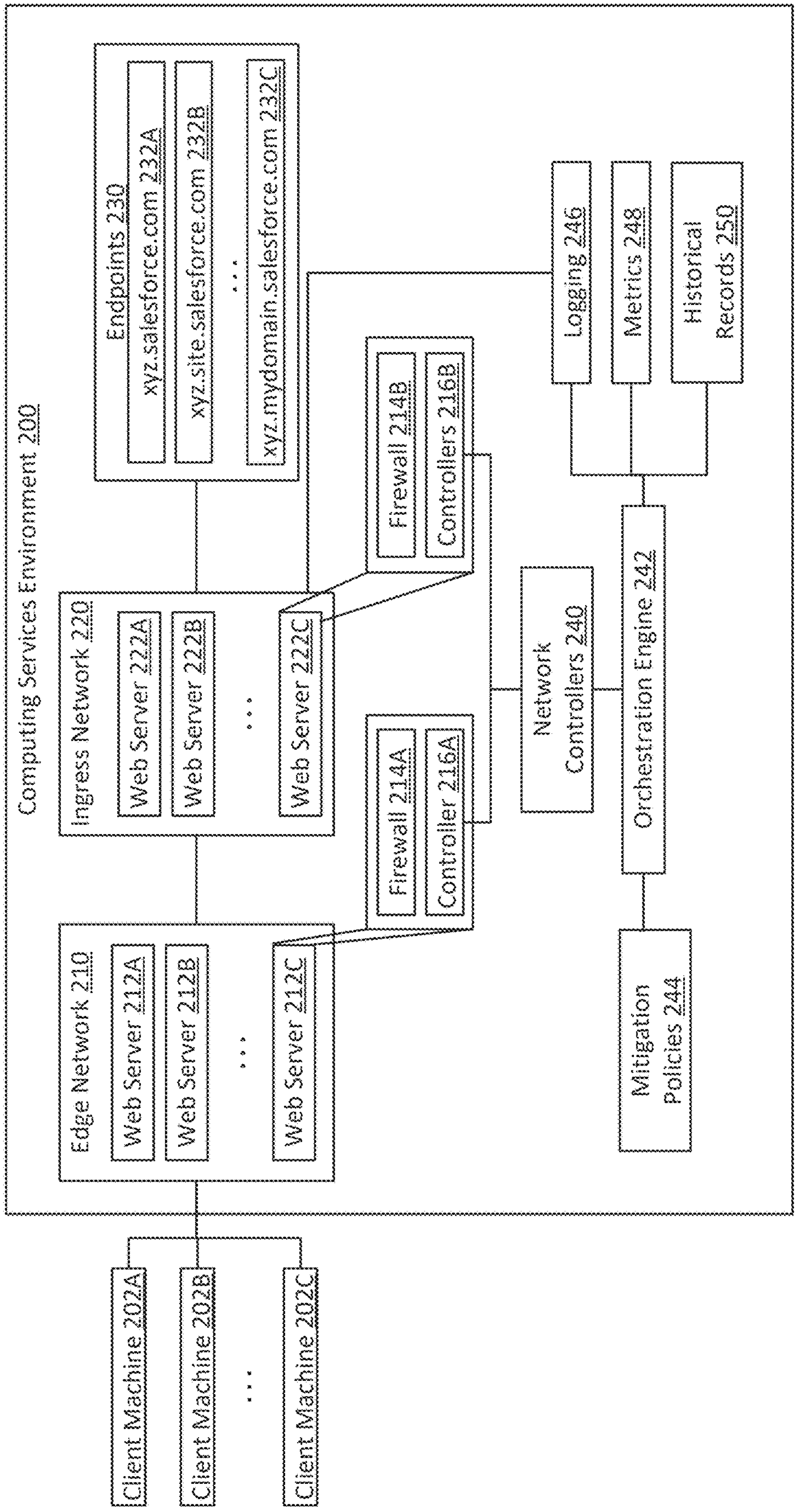
FIG. 2 illustrates one example of a computing services environment, configured in accordance with one or more embodiments.

FIG. 2 illustrates one example of a computing services environment 200. According to various embodiments, the computing services environment 200 includes an edge network 210, an ingress network 220, a set of domain endpoints 230, network controllers 240, an orchestration engine 242, mitigation policies 244, a logging database 246, a metrics database 248, and historical records 250. The edge network 210 and ingress networks 220 contain one or more web servers depicted as edge network web servers (212A, 212B, and 212C) and ingress network web servers (222A, 222B, and 222C). The domain endpoints 230 containing one or more domain endpoints depicted as (232A, 232B, and 232C). Each web server contains a firewall 214, and a controller 216. The edge network webserver 212C includes a firewall 214A and a controller 216A, while the ingress network webserver 222C includes a firewall 214B and a controller 216B. Additional details regarding various elements that may be included in a computing services environment are discussed with respect to FIG. 9, FIG. 10A, FIG. 10B, and FIG. 11.

The one or more client machines (202A, 202B, and 202C) interact with one or more domain endpoints (232A, 232B, and 232C) via the computing services environment 200. In some embodiments, the interaction includes one or more client requests routed via a communication channel including a webserver (212A, 212B, and 212C) from the edge network 210, to the ingress network (220).

According to various embodiments, the edge network 210 receives one or more requests to access one or more domain endpoints from one or more client machines from across the internet. The edge network then routes the request traffic from the client machine to the appropriate web server in the ingress network to eventually reach the endpoint. However, a combination of client machines may instigate a DDoS attack on the computing services environment by intentionally sending spurious traffic to one or more domain endpoints. For example, malicious traffic may be caused by one or more cybersecurity attack techniques.

The edge network 210 includes one or more web servers (212A, 212B, and 212C). The web server 202 contains a firewall 214A and a controller 216A. Thus, the edge network may contain a separate layer of security. For example, a web server inside the edge network may contain a separate firewall to filter requests. As another example, the edge network may have a dedicated firewall filtering requests before they reach dedicated web servers that connect to the ingress network.

According to various embodiments, the ingress network 220 contains one or more webservers that connect to one or more domain endpoints 230. For example, the ingress network connects the requests sent from the client machines to one or more domain endpoints.

In some embodiments, the ingress network may contain a separate layer of security. For example, a web server inside the ingress network may contain a separate firewall to filter requests. As another example, the ingress network may have a dedicated firewall filtering requests before they reach dedicated web servers that connect to the domain endpoints.

In some embodiments, the ingress network 220 may be a separate network than the edge network. For example, in computing service environments with heavy traffic, a dedicated ingress network may manage the traffic from one or more client machines to one or more domain endpoints via one or more web servers in an edge network and via one or more web servers in an ingress network.

According to various embodiments, the domain endpoints 230 contains domain web addresses that may be accessible via the internet. One or more domain endpoints (232A, 232B, and 232C) are available in the domain endpoint set 230.

According to various embodiments, different domain endpoints may experience different traffic volumes. For example, a popular website may experience more traffic than a newly created website. As another example, a newly created website may experience more traffic than expected based on its popularity prior to launch.

In some embodiments, a domain endpoint may be a subdomain of a parent domain. For example, salesforce.com may be considered a parent domain to the child domain mail.salesforce.com.

According to various embodiments, the network controllers 240 may contain one or more controllers to update the controllers of one or more web servers in one or more networks. For example, the network controller may update the security of a web server based on a mitigation policy. As another example, the network controller may update one or more web server controllers to aid with the firewall protection depending on mitigation policies enacted by the orchestration engine.

In some embodiments, the network controllers may control the edge and/or ingress networks. For example, a mitigation policy may make amendments to a webserver in the ingress network. As another example, a mitigation policy may make amendments to the firewall of a web server in the edge network.

According to various embodiment, the orchestration engine 242 detects and mitigates any application-layer DDoS attacks via communication to one or more services. For example, the orchestration engine may communicate with one or more services from the logging database, metrics database, historical records, and the mitigation policies to aid with the detection and mitigation of application-layer DDoS attacks.

In some embodiments the orchestration engine 242 may include one or more services running on one or more machines working to detect and mitigate application-layer DDoS attacks. For example, having a dedicated service to detect attacks, a dedicated service to mitigate the attack, and a separate service to generate reports. As another example, the training and/or deployment of an artificial intelligence model may be done in a separate service. As yet another example, the orchestration engine may send a web server a mitigation policy via one or more of the network controllers 240.

According to various embodiments, the mitigation polices 244 may include policies to aid with the mitigation of application-layer DDoS attacks. For example, some mitigation policies may contain polices regarding the throttling traffic from one or more client machines, staggering traffic, re-directing traffic, adding client machine information to a list for future reference. As another example, a mitigation policy may add one or more client machine information to a block list to prevent future traffic from causing a DDoS attack.

According to various embodiments, the logging database 246 may store logging information from any element inside the computing services environment. For example, logs may contain relevant data such as client machine information, domain endpoints accessed, and duration of connection.

According to various embodiments, the metrics database 248 may contain any metrics that aid with the detection and mitigation of application-layer DDoS attacks. For instance, the metrics database may include data reflecting measured performance at one or more elements in the computing services environment.

According to various embodiments, the historical records 250 may contain any information required to detect and mitigate application-layer DDoS attacks. For example, historical information may be stored such as traffic spikes information, previous mitigation policies, mitigation policy success rate, and incident reports.

Figure 3:
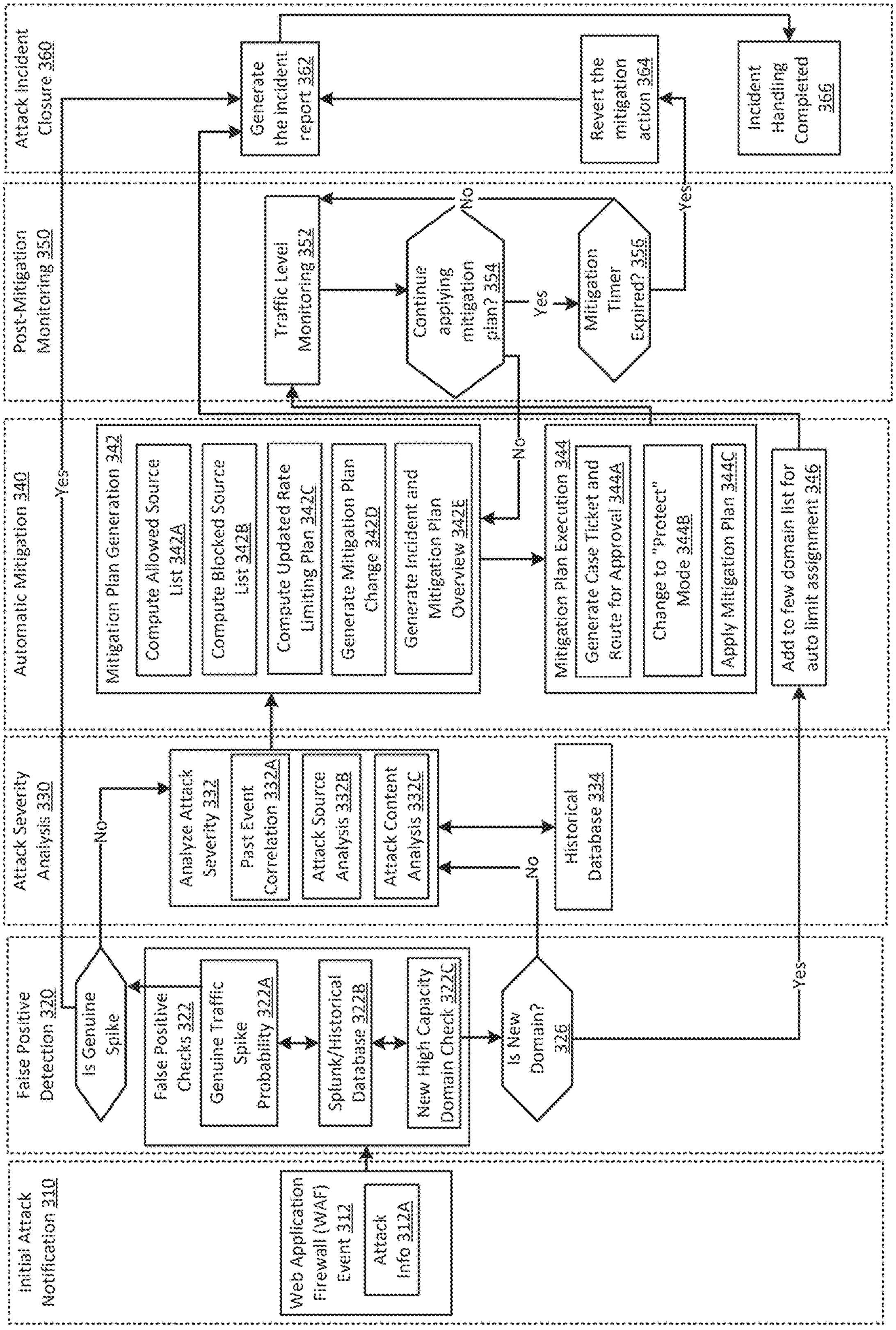
FIG. 3 illustrates an example of an overview flowchart illustrating various operations performed in the course of identifying and mitigating an application-layer DDoS attack, configured in accordance with one or more embodiments.

FIG. 3 illustrates an example of an overview flowchart 300 illustrating various operations performed in the course of identifying and mitigating an application-layer DDoS attack, configured in accordance with one or more embodiments. According to various embodiments, the overview diagram 300 includes the following phases: an initial attack notification phase 310, a false positive detection phase 320, an attack severity analysis phase 330, an automatic mitigation phase 340, a post-mitigation monitoring phase 350, and an attack incident closure 360 phase.

The initial attack notification phase 310, includes a Web Application Firewall (WAF) event 312. The WAF event may include information about the status of the web application firewall including any attack information 312A. In some embodiments, the attack information 312A includes information used to detect and mitigate an application-layer DDoS attack. For example, the attack information may include information about the client machine(s), endpoints domains, edge network, and ingress network. Additional details regarding the initial attack notification are discussed with respect to the method 500 shown in FIG. 5.

According to various embodiments, the false positive detection phase at 320 involves a false positive check at 322, a determination as to the genuineness of a traffic spike at 324, and a determination as to whether the traffic is related to a new domain 326. The false positive check at 322 may involve calculating the probability that the traffic spike is genuine at 322A, identifying one or more reference historical records at 322B, and/or performing a new high capacity domain check 322C. Additional details regarding the false positive detection phase are discussed with respect to the method 600 shown in FIG. 6.

According to various embodiments, the attack severity analysis phase 330 may involve analyzing attack severity at 332 and/or communicating with the historical database 334. Analyzing attack severity at 332 may involve one or more of past event correlation 332A, attack source analysis 332B, and attack content analysis 332C. Additional details regarding the attack severity analysis are discussed with respect to the method 700 shown in FIG. 7.

According to various embodiments, the automatic mitigation phase 340 may involve one or more of the generation of a mitigation plan at 342, the execution of the mitigation plan at 344, and assigning a threshold for a new domain at 346. Additional details regarding such operations are discussed with respect to the method 600 shown in FIG. 6.

According to various embodiments, mitigation plan generation 342 may involve one or more of determining an allowed source list 342A, determining a blocked source list 342B, and/or determining an updated rate limiting plan 342C, generating a mitigation plan change 342D, and generating an incident and mitigation plan overview 432E. That is, mitigation plan generation may involve classification of the sources of messages.

In some embodiments, one set of sources may be classified as "bad", or believed to be associated with malicious behavior. Bad sources may be identified based on any of a variety of information or characteristics. For example, a source associated with an internet protocol (IP) address that has been predetermined as being associated with malicious activities may be identified as bad. As another example, a source that requests access to various URLs that are not actually served by the computing services environment may be identified as bad. As yet another example, a source that repeatedly submits login requests that are rejected by the system may be identified as bad. As still another example, a source that accesses many different domains in a short period of time may be identified as bad. More generally, a source may be identified as bad by questionable behavior at the network layer, the transport layer, and/or the application layer of the Open Systems Interconnection model.

According to various embodiments, sources identified as bad may be blocked, at least temporarily, from sending future requests to one or more components of the computing services environment. For instance, a source identified as bad may be restricted from sending requests to an application via a mitigation policy imposed at an edge network and/or ingress network web server, at least for a period of time.

In some embodiments, one set of sources may be classified as "good." Good sources may be those identified as having transmitted requests identified as normal. For example, a source that transmits a login request that successfully authenticates to the system may be identified as good. As another example, a source that transmits a small number of requests for URLs that are actually served by the computing services environment may be identified as good. More generally, source may be identified as good based on behavior at the network layer, the transport layer, and/or the application layer of the Open Systems Interconnection model.

In some embodiments, one set of sources may be classified as "unknown." Unknown sources may be those for which insufficient information is available for a definitive classification. Initially, for instance at the beginning of a distributed denial of service attack, a potentially large portion of incoming requests may be received from sources classified as unknown. However, many such sources may be subsequently classified as either good or bad as more information becomes available.

In some embodiments, unknown sources may be subjected to rate limiting or other forms of traffic shaping. For instance, rate limiting for unknown sources may be increased in proportion to the severity of the distributed denial of service attack to help ensure that service can continue to be provided to sources identified as good. Additional details regarding such operations are discussed with respect to the method 700 shown in FIG. 7.

According to various embodiments, mitigation plan execution 344 may involve one or more of generating a case ticket and route for approval 344A, changing to "protect" mode 344B, and applying mitigation plan 344C. Additional details regarding mitigation plan execution are discussed with respect to the method 500 shown in FIG. 5.

According to various embodiments, the post-mitigation monitoring phase 350 may involve traffic level monitoring 352, determining whether to continue applying mitigation plan 354, and determining whether to continue traffic level monitoring based on the expiration of the mitigation timer at 356. Additional details regarding post-mitigation strategy monitoring are discussed with respect to the method 800 shown in FIG. 8.

According to various embodiments, they attack incident closure 360 phase may involve one or more of generating an incident report 362, reverting the mitigation action at 364 based on the expiration of the migration timer 356, and completing incident handling at 366. Additional details regarding such operations are discussed with respect to the method 800 shown in FIG. 8.

Figure 4:
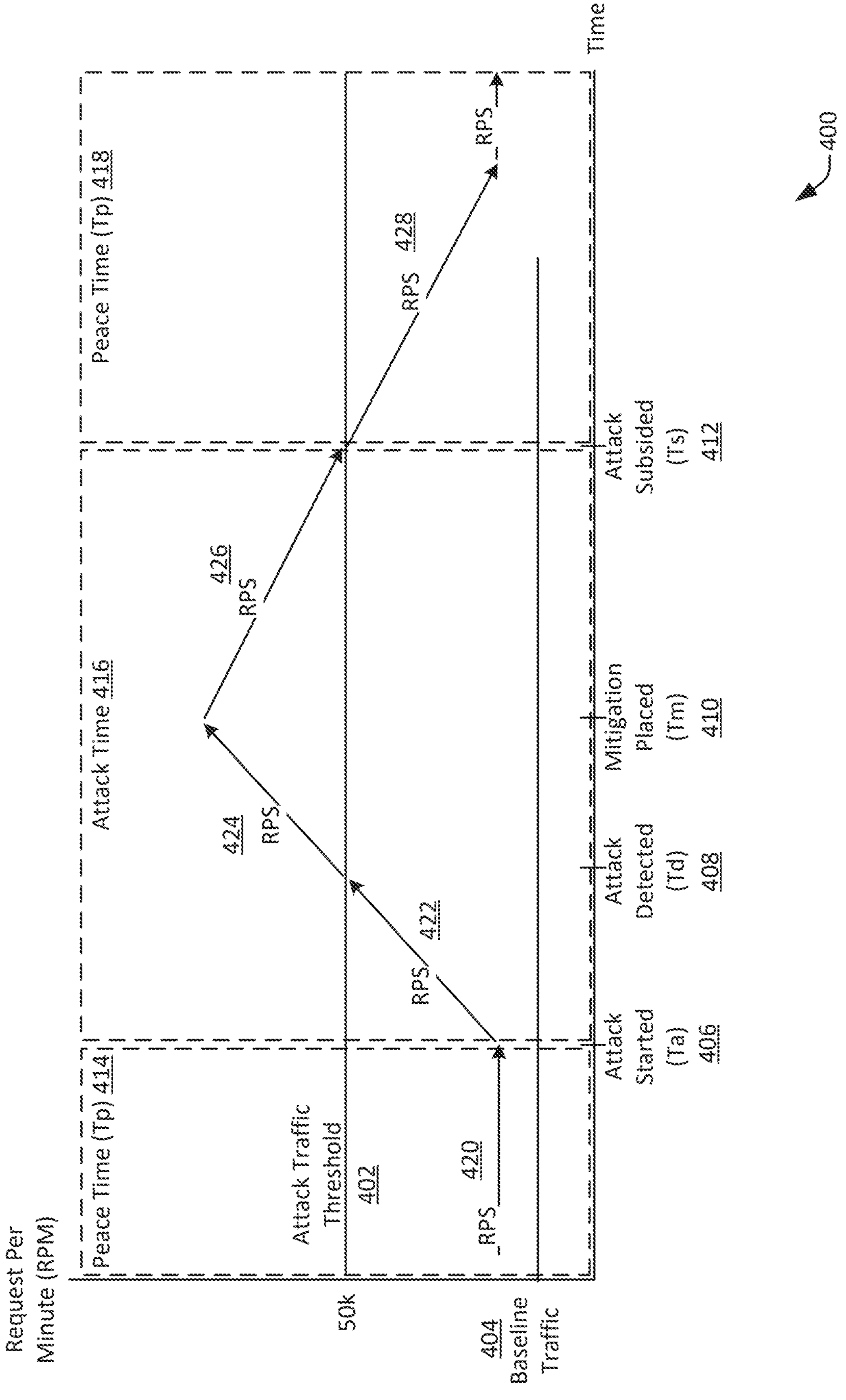
FIG. 4 illustrates one example of a response diagram, generated in accordance with one or more embodiments.

FIG. 4 illustrates one example of a response diagram 400, configured in accordance with one or more embodiments. According to various embodiments, the response diagram 400 depicts an example of a lifecycle of an L7 DDoS attack, including a peace time before an attack has started 414 followed by the time under which the DDoS attack is taking place 416 and a subsequent peace time 418. A sample attack traffic threshold is shown at 402, a baseline traffic level is shown at 404, and a line plotting requests per minute traffic is shown at 420, 422, 424, 426, and 428. The x-axis represents time and the y-axis represents request per minute for a given domain endpoint. The response diagram 400 may be determined based on information extracted from logs, metrics, historical data and may be used to visually represent the phases through which a hypothetical application-layer DDoS attack traverses.

A peace time phase is depicted at 414. According to various embodiments, the requests per minute 420 and the baseline traffic 404 does not exceed attack traffic threshold. The peacetime phase ends when the attack has started at 406.

An attack time phase is depicted at 416. The traffic begins to increase at 422 relative to the peacetime traffic 420. The attack started time 406 is the time the attack is estimated to have started based on when the traffic begins to increase due to the attack. The attack is detected at 408 when the traffic 422 exceeds the attack traffic threshold 402. The attack mitigation strategy generation method is executed when the attack is detected at 408, leading to the implementation of a mitigation plan at 410. After the mitigation plan is placed at 410, the traffic 426 reduces until the traffic has subsided at 412, when the traffic is below the attack traffic threshold 402.

A peace time phase is depicted at 418. According to various embodiments, the peace time phase occurs when the attack has subsided. The attack may be determined to have subsided when the traffic is below the attack traffic threshold 402. The traffic 428 may continue to decrease until it reaches levels similar to that of traffic 420, before the attack took place, or the baseline traffic at 404.

Figure 5:
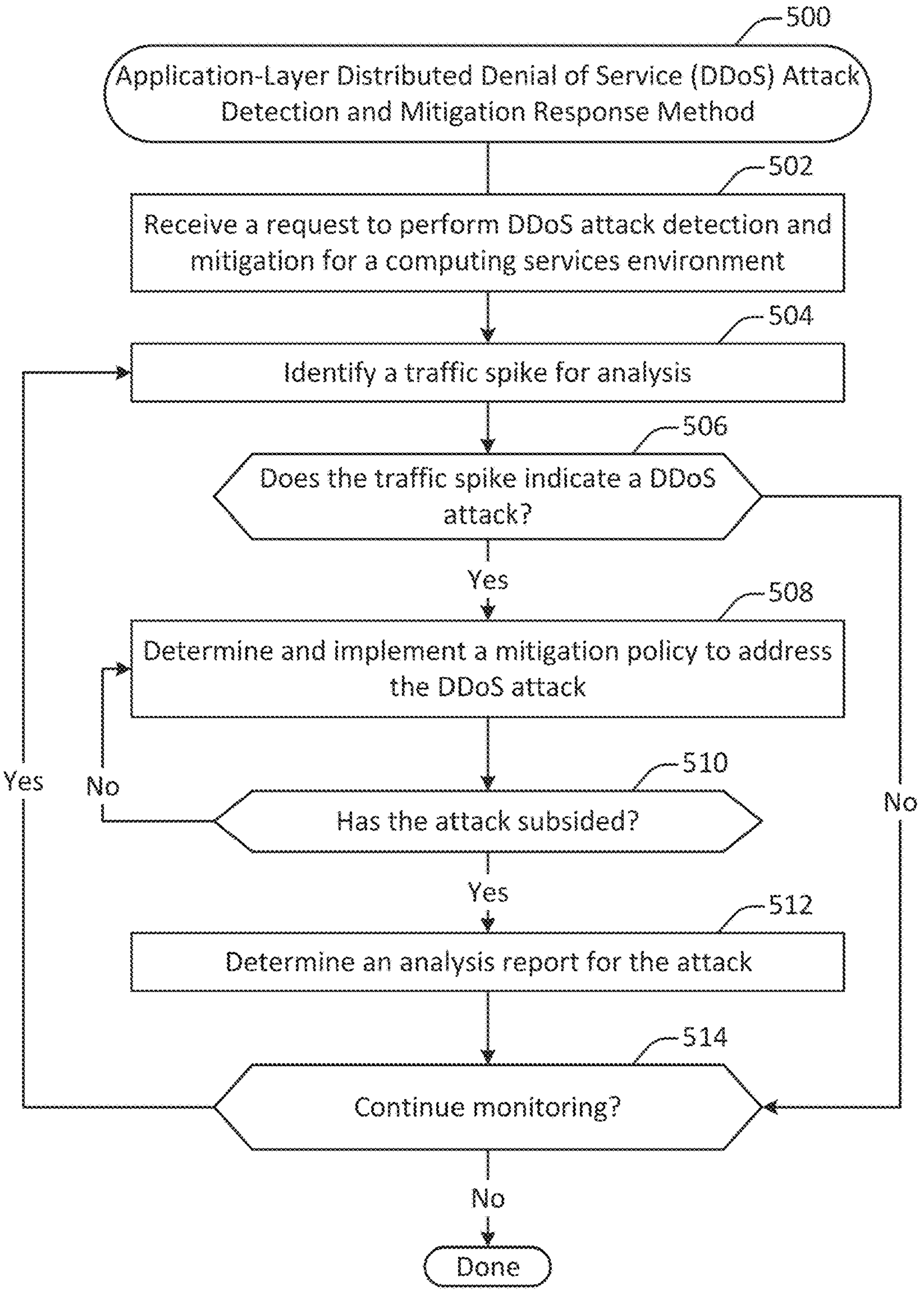
FIG. 5 illustrates a method of application-layer distributed denial of service attack detection and mitigation response, performed in accordance with one or more embodiments.

FIG. 5 illustrate a method 500 for detecting and mitigation an application-layer distributed denial of service attack, performed in accordance with one or more embodiments. According to various embodiments, DDoS attack detection and mitigation may involve operations such as determining if a traffic spike indicates a DDoS Attack, determining and implementing a DDoS mitigation policy, verifying if the attack has subsided, and determining an analysis report. The method 500 may be performed at the computing services environment 200 shown in FIG. 2, for instance at the orchestration engine 242.

A request to perform DDoS attack detection and mitigation for a computing services environment is received at 502. The request may be triggered depending on conditions occurring in other parts of the computing services environment 200. In some embodiments, the request may be triggered depending on the volume of traffic. For example, the request may be triggered whenever the traffic volume for a given set of domains exceeds threshold. As another example, the request may be triggered whenever a change in rate of traffic for a given set of domains exceeds a rate change threshold.

According to various embodiments, the request may be triggered depending on characteristics of the computing services environment 200. For example, one or more domains may be more prone to DDoS attacks. As another example, one or more channels may be particularly prone to DDoS attacks, for instance based on the resources available at a given time or the domains accessible via the one or more channels.

A traffic spike is identified for analysis at 504. A traffic spike may include traffic from one or more sources to one or more endpoints via one or more channel paths. In some embodiments, the traffic identified for analysis may include additional traffic. For example, traffic leading up to the traffic spike may also be identified for analysis.

According to various embodiments, some or all of the traffic may be identified for analysis. For example, some traffic, such as traffic predetermined as valid, may be filtered out when analyzing the traffic spike.

A determination is made at 506 as to whether the traffic spike indicates a DDoS attack. According to various embodiments, the classification of a traffic spike being a DDoS attack may involve one or more of various techniques. For example, non-malicious traffic may be filtered out. As another example, one or more data augmentation techniques may be employed, for instance to determine supplemental metadata characterizing the traffic. As another example, synthetic data may be generated to aid in the evaluation, for instance if suitable comparison data is limited.

In some embodiments, a traffic spike classification technique may involve using one or more artificial intelligence models (e.g. classification models) to classify some or all of the traffic. Alternatively, or additionally, traffic spike classification may involve historical information. For example, historical trends and/or previous traffic spike classifications may also aid with classification.

A mitigation policy to address the DDoS attack is determined and implemented at 508. According to various embodiments, the determination of a DDoS attack mitigation policy may involve one or more techniques, for instance techniques involving one or more artificial intelligence and/or machine learning models. For example, the mitigation policy may be determined by using machine learning to predict the probability of success for a mitigation policy. As another example, machine learning model may be used to classify the type of attack to improve the determination operation. As yet another example, a large language model may be used to generate some or all of the mitigation policy and/or a description of the mitigation policy.

In some embodiments, the implementation of the mitigation policy to address the DDoS attack may involve sending instructions to one or more network controllers. For example, upon receiving the mitigation policy, the network controllers may begin to throttle the traffic from one or more sources, ultimately mitigating the DDoS attack. As another example, the network controllers may include instructions from the mitigation policy to amend the firewall of a web server, ultimately mitigating the DDoS attack.

In some embodiments, the network controllers may implement some or all of the mitigation policy at a future point in time. For example, mitigation policy may include one or more instructions to execute at a predetermined time. Alternatively, or additionally, the network controllers may implement some or all of the mitigation policy upon receiving the policy.

A determination is made at 510, as to whether the attack has subsided. According to various embodiments, one or more of various techniques may be employed to evaluate if the attack has subsided. The traffic volume may be used as a metric to guide the determination. For example, the overall traffic volume may be compared against a threshold to determine if an attack has subsided. As another example, the reduction in traffic volume from one or more sources may also indicate the DDoS attack has subsided. As yet another example, the rate of change in traffic volume may also be used to determine if a DDoS attack has subsided.

An analysis report is determined for the attack at 512. The analysis report may contain relevant information about the DDoS attack, mitigation strategy, and other information to provide a holistic report. Some or all of the analysis report may be stored for future reference.

In some embodiments, the analysis report may be used to improve the determinations made by the orchestration engine 242. For example, the orchestration engine may interpret historical analysis reports to improve the determinations made during the mitigation strategy determination.

In some embodiments, the one or more analysis reports may be transmitted to appropriate entities. For example, one or more analysis reports may be transmitted to other services or to a human network administrator. As another example, one or more analysis reports may be transmitted to one or more entities accessing services via the computing services environment 200.

A determination is made at 514, as to whether to continue monitoring. In some embodiments, monitoring may continue until a request to cease monitoring has been received. Alternatively, or additionally, monitoring may continue until a DDoS attack has been successfully mitigated.

Figure 6:
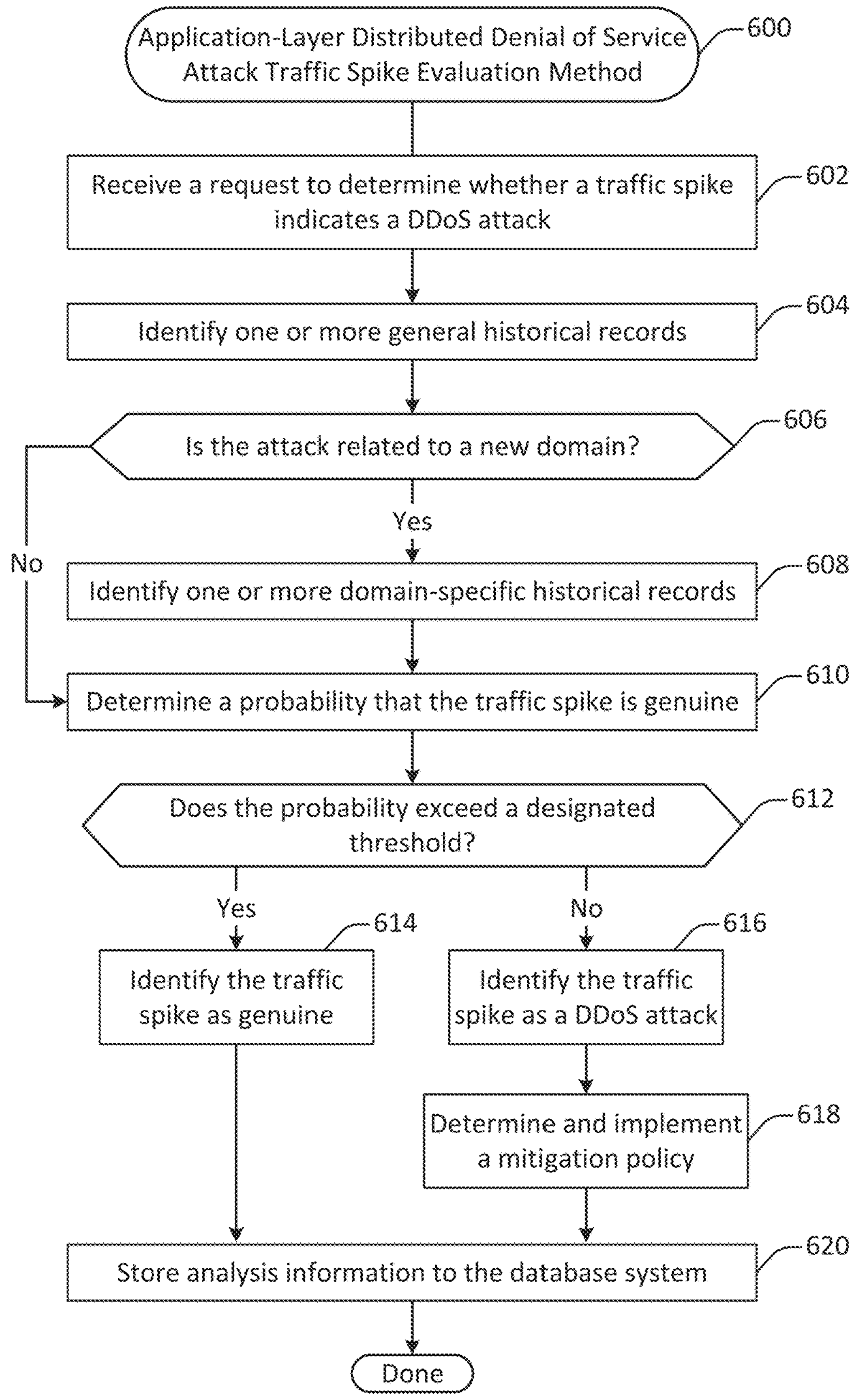
FIG. 6 illustrates a method of application-layer distributed denial of service attack traffic spike evaluation, performed in accordance with one or more embodiments.

FIG. 6 illustrates method 600 of evaluating an application-layer distributed denial of service attack traffic spike, performed in accordance with one or more embodiments. The method 600 may be performed at the computing services environment 200 shown in FIG. 2, for instance at the orchestration engine 202. The classification of a traffic spike may involve operations such as identifying one or more historical records, determining the probability the spike is genuine, comparing the probability with a designated threshold, and storing relevant analysis information.

A request to determine whether a traffic spike indicates a DDoS attack is received at 602. In some embodiments, the request may contain relevant information necessary to determine whether a traffic spike indicates a DDoS attack. For example, the request may contain information about the source, channel information, traffic spike thresholds, and domains.

One or more general historical records are identified at 604. In some embodiments, historical records may be used to classify the some or all of the traffic spike as genuine or a DDoS attack. For example, if traffic reflected in one or more pre-classified historical records matches some or all of the traffic spike, then the traffic spike may be classified similarly.

In some embodiments, historical records related to the traffic spike may be also identified. For example, historical records related to one or more sources of the traffic spike may be used to aid with traffic spike evaluation.

A determination is made at 606 as to whether the attack is related to a new domain. In some embodiments, the determination may be made based on a length of time that the domain has existed within the computing services environment 200. For instance, a domain that has existed for less than a predetermined period of time, such as one week or one month, may be classified as "new". Such a classification may help to determine the extent to which classification of the traffic spike is informed by historical records for the domain under analysis versus more general historical records covering various domains.

Upon determining that the attack is related to an existing domain, then one or more domain-specific historical records are identified at 608. In some embodiments, domain-specific historical records may include records about previous traffic spike evaluations. For example, domain-specific historical traffic spikes were determined to be genuine. If instead the attack is determined to not be related to an existing domain, then at 610 a probability that the traffic spike is genuine is determined. In some embodiments, the determination is made by looking up the domain associated with the traffic spike in the historical domain records.

In some embodiments, related domain-specific historical records may be identified when the domain is new. For example, if the new domain is an ecommerce website, related ecommerce website historical records are identified. As another example, if the new domain (e.g. mail.salesforce.com) is related to a main domain (e.g. salesforce.com) then the historical records of the main domain may be used instead.

Although the determination as to whether the domain is new is shown in FIG. 6 as being a binary determination, in practice the determination may be more continuous. For example, the more historical data is available for a given domain, the more such domain-specific historical data may be prioritized over more general historical data when evaluating traffic for the domain.

The probability that the traffic spike is genuine is determined at 610. According to various embodiments, the probability may be calculated in a variety of ways, including one or more techniques based in artificial intelligence, machine learning, and/or statistical analysis. For example, a machine learning classification model, logistic regression classifier model, linear probability model, or other such model may be pre-trained on historical data to classify traffic spikes as genuine or not based on previous classification information. In some configurations, an ensemble model combining various classifiers may be used.

According to various embodiments the probability the traffic spike is genuine may also be determined based on how much traffic the domain has received. For instance, newer domains have a higher probability of a traffic spike being genuine. Such information may be determined based on historical data and may be context specific, such as specific to particular industries or types of domains.

A determination is made at 612 as to whether the probability exceeded a designated threshold. In some embodiments, the confidence of the probability is also considered when determining the determination step. For example, given a machine learning model, if the confidence score of a traffic spike being classified as a DDoS attack is low, then the traffic spike may be initially identified as genuine and then reevaluated when new information becomes available.

Based on the determination made at 612, the traffic spike is identified as either genuine at 614 or a DDoS attack at 616. The identification of the traffic spike as a DDoS attack may trigger the determination and implementation of a mitigation policy at 618 as discussed with respect to the method 700 shown in FIG. 7.

Analysis information is stored on the database system at 620. According to various embodiments, the analysis information selected to be stored may include any relevant information created or determined during the traffic spike evaluation method. For instance, the analysis information stored may include information about the request received, any determinations made, and/or the traffic spike evaluation method.

According to various embodiments, the analysis information may also be referenced in part or full in related reports. For example, the traffic spike analysis report may be referenced in part or full in the mitigation analysis report. For another example, the traffic spike evaluation may also be used to train future models to improve the traffic spike evaluation method.

Figure 7:
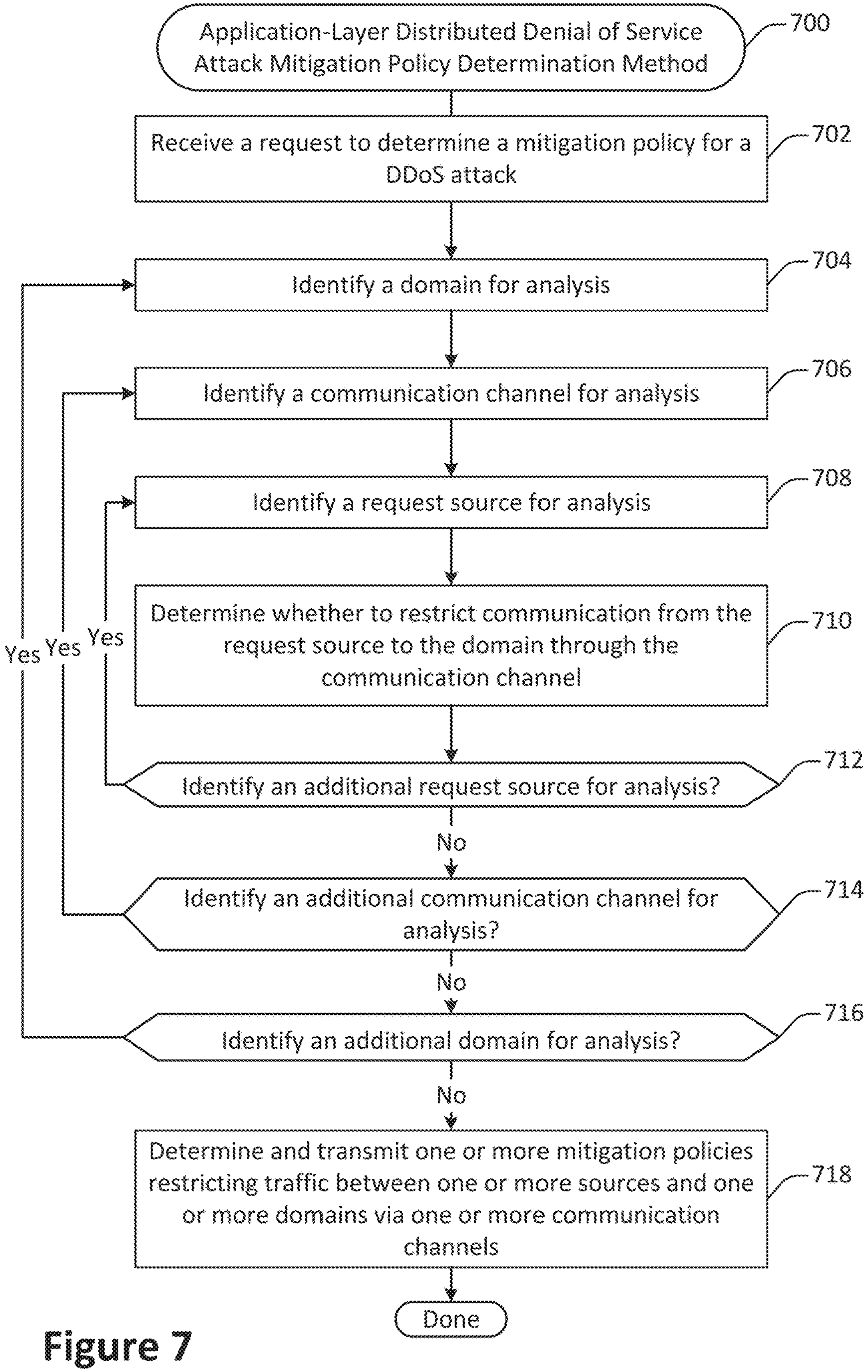
FIG. 7 illustrates a method of determining an application-layer distributed denial of service attack mitigation policy, performed in accordance with one or more embodiments.

FIG. 7 illustrates method 700 of determining an application-layer distributed denial of service attack mitigation policy, performed in accordance with one or more embodiments. According to various embodiments, the DDoS attack mitigation policy determination may involve identifying a permutation of information containing a mixture of a domain, communication channel, and request source for which to restrict traffic, as well as any information about how traffic is to be restricted. The method 700 may be performed at the computing services environment 200 shown in FIG. 2, for instance at the orchestration engine 242.

A request to determine a mitigation policy for a DDoS attack is received at 702. The request may relevant information such as historical, source, timestamps, endpoint domain, channel, client machine(s), and any other relevant information required to determine a mitigation policy for a DDoS attack. The request may be generated as discussed with respect to the operation 618 shown in FIG. 6.

In some embodiments, a combination of potential DDoS attack signal combinations is selected to determine the attack mitigation policy. For example, a domain is identified for analysis at 704, a communication channel is identified for analysis at 706, and a request source is identified for analysis at 708. Such combinations may be identified an analyzed in parallel or in any suitable sequence.

A determination is made at 710, as to whether to restrict communication from the request source to the domain through the communication channel. In some embodiments, the determination may be made by using historical information. For example, the determination may use historical information about a given request source, communication channel, and/or domain to restrict communication. As another example, related historical information about a new domain may be used to determine whether to restrict communication.

In some embodiments, the determination to restrict communication from the request source to the domain through the communication channel may involve using a predetermined threshold. For example, if the requests per minute for a given set of domains through a communication channel exceeds a threshold, traffic may be restricted. As another example, the threshold may be a variable threshold depending on, and not limited to, information such as domain, communication channel, request source, and time.

According to various embodiments, the determination to restrict communication from the request source to the domain through the communication channel may involve using one or more artificial intelligence models. For example, a machine learning model trained on historical data may be used to determine whether traffic from a particular source to a particular domain via a particular communication channel is genuine.

Upon determining whether to restrict communication channel from a request source to a domain via a communication channel, the analysis process may continue by determining if other combinations should be selected. A determination is made at 712, as to whether to identify an additional request source for analysis. A determination is made at 714, as to whether to identify an additional communication channel for analysis. A determination is made at 716, as to whether to identify an additional domain for analysis. As discussed herein, such combinations may be identified an analyzed in parallel or in any suitable sequence.

One or more mitigation policies are determined and transmitted at 718. The mitigation policies may involve restricting traffic between one or more sources and one or more domains via one or more communication channels.

According to various embodiments, the one or more mitigation policies may be transmitted to one or more of the network controllers 240 shown in FIG. 2. For instance, a mitigation policy may be transmitted to a network policy response for controlling a network component to which the mitigation policy applies.

In some embodiments, traffic may be blocked completion. For example, traffic from a particular source to a particular domain via a particular channel may be blocked at the edge network and/or ingress network level.

In some embodiments, a mitigation policy may throttle the traffic from the source flowing through the communication channel to the domain endpoint. For example, the mitigation policy may add a timeout feature to increase the time between requests from one or more sources to one or more domains via one or more communication channels.

In some embodiments, the mitigation policy may contain a mitigation policy timer. For example, if the mitigation policy timer has expired, then the mitigation may be reverted.

In some embodiments, the mitigation policy may divert traffic flowing through a given communication channel. For example, the mitigation policy may specify diverting non-malicious traffic to one or more communication channels. As another example, the mitigation policy may allow traffic for a certain timeframe before diverting all traffic to one or more communication channels. Diverted traffic may later be re-diverted back to the initial communication channel depending on the effectiveness of the mitigation policy.

According to various embodiments, a mitigation policy may be specific to one or more of: one or more domains, one or more traffic sources, and/or one or more network ingress paths. For example, a mitigation policy may block or redirect traffic via a particular network ingress path without necessarily being specific to a domain or a traffic source. As another example, a mitigation policy may block or redirect traffic from a traffic source to a domain without being specific to a particular network ingress path. Various combinations are possible.

Figure 8:
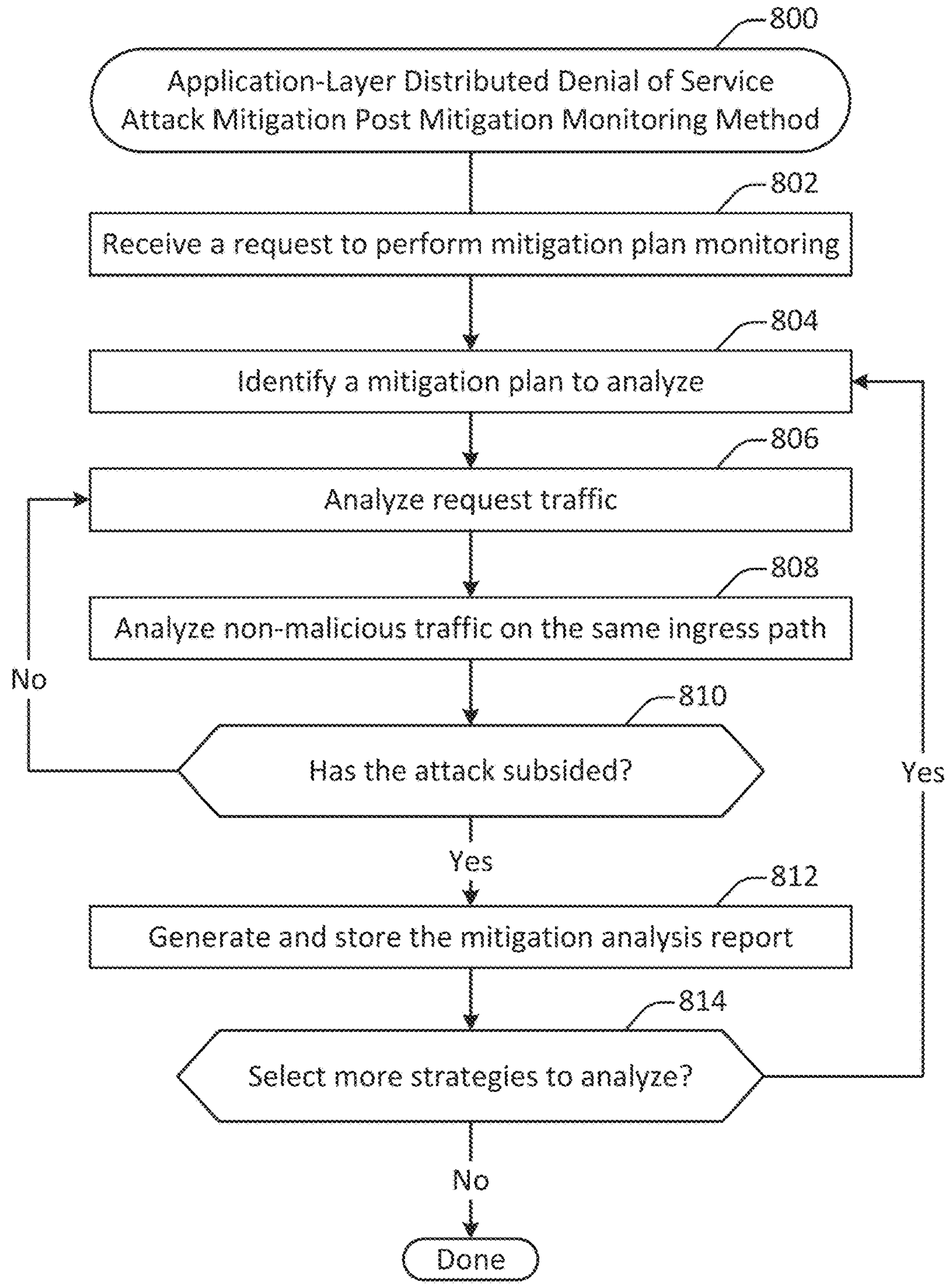
FIG. 8 illustrates a method of application-layer distributed denial of service attack mitigation post mitigation monitoring, performed in accordance with one or more embodiments.

FIG. 8 illustrates an application-layer distributed denial of service attack mitigation post mitigation monitoring method 800, performed in accordance with one or more embodiments. According to various embodiments, the DDoS attack mitigation analysis monitoring may involve analyzing the request traffic post DDoS policy enactment to evaluate the effectiveness of the mitigation policy on the given attack. The method 800 may be performed at the computing services environment 200 shown in FIG. 2, for instance at the orchestration engine 242.

A request to perform mitigation plan monitoring is received at 802. In some embodiments, the request may contain relevant information such as mitigation strategy, mitigation timeout timer, source, timestamps, endpoint domain, channel, client machine(s), and any other relevant information required to determine or monitor a mitigation policy for a DDoS attack. The request may be generated after the completion of the method 700 shown in FIG. 7.

A mitigation plan to analyze is identified at 804. The mitigation plan may be determined as discussed with respect to the method 700 shown in FIG. 7. In some embodiments, the efficacy of the mitigation strategy may be analyzed at any time after applying the mitigation plan. For example, a mitigation plan may be analyzed while its mitigation timer has not expired. As another example, the mitigation plan may be analyzed for comparison against other mitigation plans to determine an improved plan.

Request traffic is analyzed at 806. In some embodiments, the request traffic may be analyzed to determine the efficacy of the mitigation strategy. For example, the request traffic may be analyzed to determine if the overall traffic volume has changed since the mitigation plan was applied. As another example, the request traffic may be analyzed so to determine if traffic from particular sources to particular domains via particular communication channels has changed since the mitigation plan was implemented.

Non-malicious traffic on the same ingress path is analyzed at 808. In some embodiments, the non-malicious traffic may be monitored to validate that traffic from non-malicious sources continues to function as intended. As another example, non-malicious traffic may be monitored to verify that a mitigation strategy that involves diverting non-malicious traffic to a different ingress path is functioning as intended.

A determination is made at 810, as to whether the attack has subsided. In some embodiments, the determination is made by inspecting the traffic volume at one or more time ranges. For example, overall traffic volume may be compared with the DDoS traffic threshold. As another example, the amount of traffic originating from the source machines subject to the mitigation policy may be evaluated. For instance, determining if a DDoS attack has subsided may involve verifying that the traffic from the malicious client machines has decreased.

The mitigation analysis report may be generated and stored at 812. In some embodiments, generating the mitigation analysis report may involve operations such as comparing the results, storing the mitigation analysis, and/or generating a description of the results.

According to various embodiments, generating the mitigation analysis report may involve comparing the mitigation strategy against a simulation. For example, the mitigation strategy traffic volume may be compared to an expected traffic volume. As another example, the mitigation strategy traffic may be analyzed to determine the efficacy of the strategy in terms of time elapsed for attack mitigation.

Any relevant information generated by the analysis may be stored. In some embodiments, the mitigation analysis results may be stored to determine future mitigation strategies. For example, stored analysis may be used to determine a future mitigation strategy based on the effects the mitigation strategy had on the traffic. As another example, the stored analysis may be used to generate aggregate reports.

In some embodiments, a mitigation analysis report may be generated based on an interaction with a generative language model. For instance, a generative language model may be provided with information about an attack, a mitigation policy, and/or the performance of a mitigation policy in a prompt, along with one or more natural language instructions to generate a report based on the information. The generative language model may then complete the prompt with novel text that characterizes the information. Such text may then be stored and/or provided to one or more recipients. For instance, the report may be sent to an organization accessing computing services via the computing services environment and which may have been affected by the L7 DDoS attack.

A determination is made at 814, as to whether to select more strategies to analyze. In some embodiments, multiple strategies may be analyzed depending on the complexity of the DDoS attack. For example, given a complex DDoS attack from a variety of sources that continuously change, one or more mitigation policies may need to be applied that handle some or all of the affected DDoS attack traffic.

Figure 9:
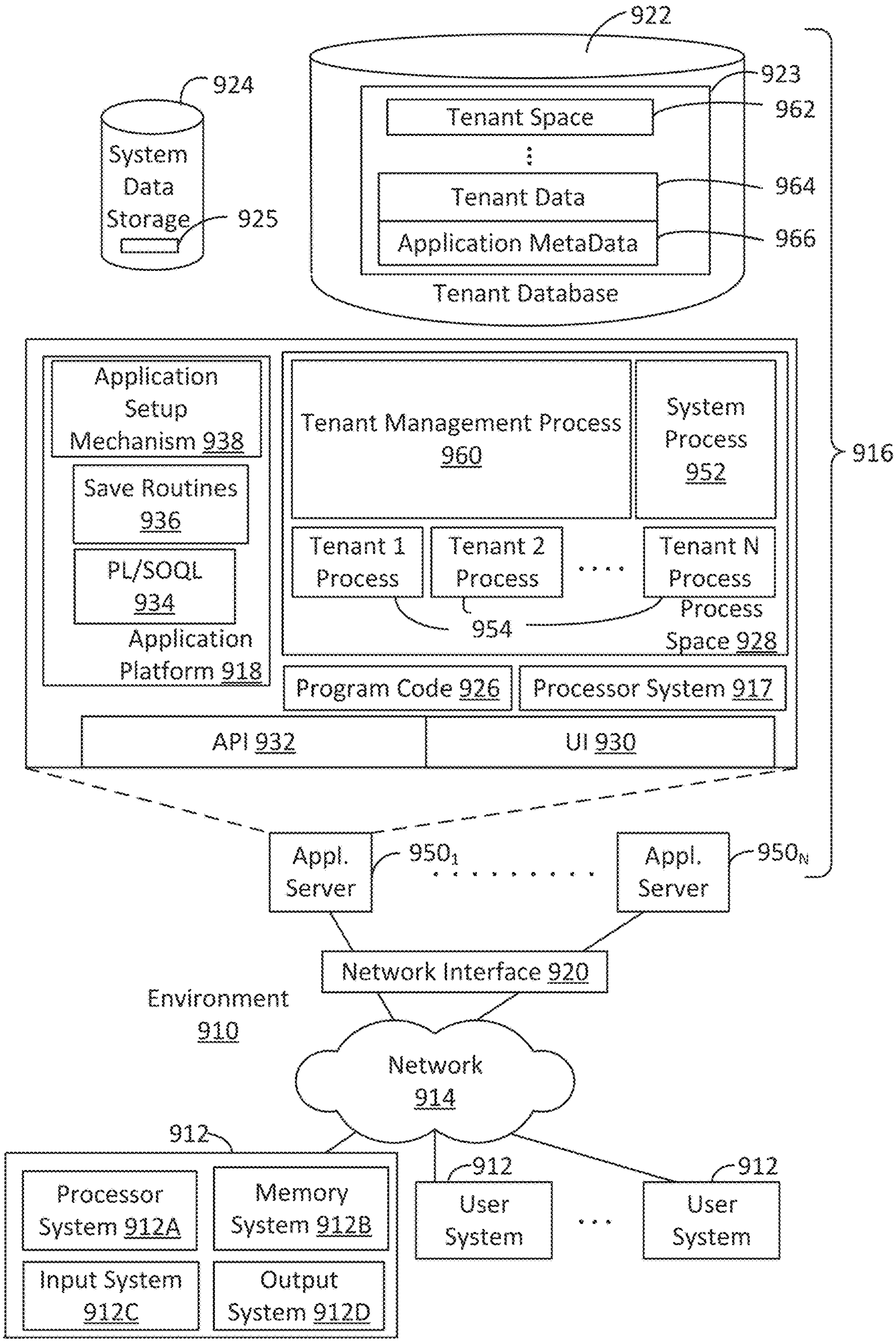
FIG. 9 shows a block diagram of an example of an environment that includes an on-demand database service configured in accordance with some implementations.

FIG. 9 shows a block diagram of an example of an environment 910 that includes an on-demand database service configured in accordance with some implementations. Environment 910 may include user systems 912, network 914, database system 916, processor system 917, application platform 918, network interface 920, tenant data storage 922, tenant data 923, system data storage 924, system data 925, program code 926, process space 928, User Interface (UI) 930, Application Program Interface (API) 932, PL/SOQL 934, save routines 936, application setup mechanism 938, application servers 950-1 through 950-N, system process space 952, tenant process spaces 954, tenant management process space 960, tenant storage space 962, user storage 964, and application metadata 966. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 916, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 918 may be a framework that allows the creation, management, and execution of applications in system 916. Such applications may be developed by the database service provider or by users or third-party application developers accessing the service. Application platform 918 includes an application setup mechanism 938 that supports application developers' creation and management of applications, which may be saved as metadata into tenant data storage 922 by save routines 936 for execution by subscribers as one or more tenant process spaces 954 managed by tenant management process 960 for example. Invocations to such applications may be coded using PL/SOQL 934 that provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 966 for a subscriber making such an invocation. Such system processes may also manage execution of application metadata 966 as an application in a virtual machine.

In some implementations, each application server 950 may handle requests for any user associated with any organization. A load balancing function (e.g., an F5 Big-IP load balancer) may distribute requests to the application servers 950 based on an algorithm such as least-connections, round robin, observed response time, etc. Each application server 950 may be configured to communicate with tenant data storage 922 and the tenant data 923 therein, and system data storage 924 and the system data 925 therein to serve requests of user systems 912. The tenant data 923 may be divided into individual tenant storage spaces 962, which can be either a physical arrangement and/or a logical arrangement of data. Within each tenant storage space 962, user storage 964 and application metadata 966 may be similarly allocated for each user. For example, a copy of a user's most recently used (MRU) items might be stored to user storage 964. Similarly, a copy of MRU items for an entire tenant organization may be stored to tenant storage space 962. A UI 930 provides a user interface and an API 932 provides an application programming interface to system 916 resident processes to users and/or developers at user systems 912.

System 916 may implement a web-based attack detection and mitigation system. For example, in some implementations, system 916 may include application servers configured to implement and execute software applications for detecting and mitigating distributed denial of service attacks. The application servers may be configured to provide related data, code, forms, web pages and other information to and from user systems 912. Additionally, the application servers may be configured to store information to, and retrieve information from a database system. Such information may include related data, objects, and/or Webpage content. With a multi-tenant system, data for multiple tenants may be stored in the same physical database object in tenant data storage 922, however, tenant data may be arranged in the storage medium(s) of tenant data storage 922 so that data of one tenant is kept logically separate from that of other tenants. In such a scheme, one tenant may not access another tenant's data, unless such data is expressly shared.

Several elements in the system shown in FIG. 9 include conventional, well-known elements that are explained only briefly here. For example, user system 912 may include processor system 912A, memory system 912B, input system 912C, and output system 912D. A user system 912 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 912 to access, process and view information, pages and applications available from system 916 over network 914. Network 914 may be any network or combination of networks of devices that communicate with one another, such as any one or any combination of a LAN (local area network), WAN (wide area network), wireless network, or other appropriate configuration.

The users of user systems 912 may differ in their respective capacities, and the capacity of a particular user system 912 to access information may be determined at least in part by "permissions" of the particular user system 912. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 916. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 916 may provide on-demand database service to user systems 912 using an MTS arrangement. By way of example, one tenant organization may be a company that employs a sales force where each salesperson uses system 916 to manage their sales process. Thus, a user in such an organization may maintain contact data, leads data, customer follow-up data, performance data, goals and progress data, etc., all applicable to that user's personal sales process (e.g., in tenant data storage 922). In this arrangement, a user may manage his or her sales efforts and cycles from a variety of devices, since relevant data and applications to interact with (e.g., access, view, modify, report, transmit, calculate, etc.) such data may be maintained and accessed by any user system 912 having network access.

When implemented in an MTS arrangement, system 916 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 916 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 916 may also maintain system-level data usable by multiple tenants or other data. Such system-level data may include industry reports, news, postings, and the like that are sharable between tenant organizations.

In some implementations, user systems 912 may be client systems communicating with application servers 950 to request and update system-level and tenant-level data from system 916. By way of example, user systems 912 may send one or more queries requesting data of a database maintained in tenant data storage 922 and/or system data storage 924. An application server 950 of system 916 may automatically generate one or more SQL statements (e.g., one or more SQL queries) that are designed to access the requested data. System data storage 924 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 10A:
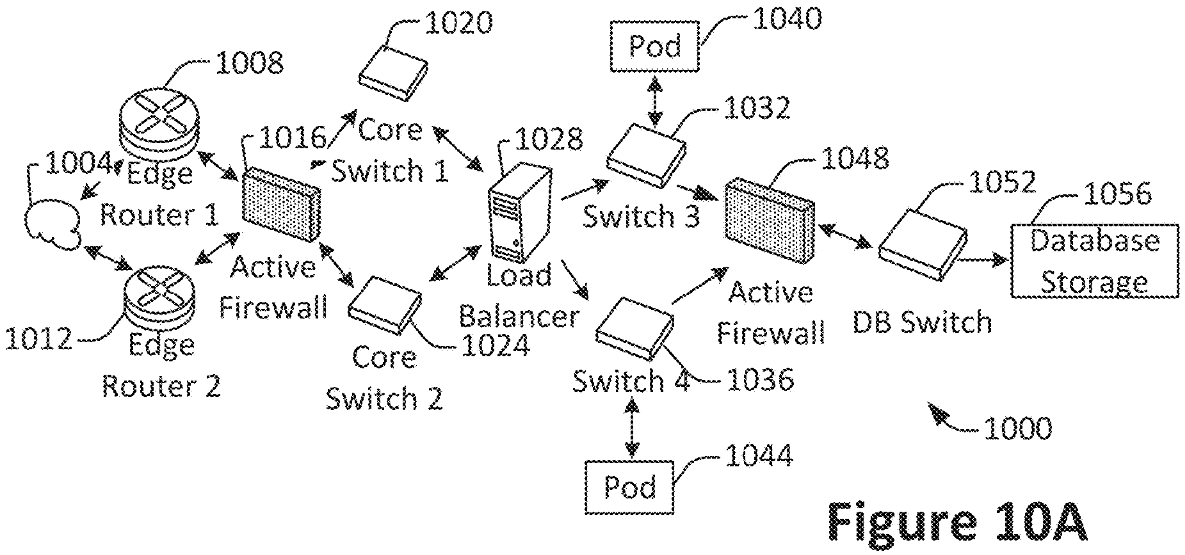
FIG. 10A shows a system diagram of an example of architectural components of an on-demand database service environment, configured in accordance with some implementations.

FIG. 10A shows a system diagram of an example of architectural components of an on-demand database service environment 1000, configured in accordance with some implementations. A client machine located in the cloud 1004 may communicate with the on-demand database service environment via one or more edge routers 1008 and 1012. A client machine may include any of the examples of user systems 912 described above. The edge routers 1008 and 1012 may communicate with one or more core switches 1020 and 1024 via firewall 1016. The core switches may communicate with a load balancer 1028, which may distribute server load over different pods, such as the pods 1040 and 1044 by communication via pod switches 1032 and 1036. The pods 1040 and 1044, which may each include one or more servers and/or other computing resources, may perform data processing and other operations used to provide on-demand services. Components of the environment may communicate with a database storage 1056 via a database firewall 1048 and a database switch 1052.

Accessing an on-demand database service environment may involve communications transmitted among a variety of different components. The environment 1000 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 10A and 10B.

The cloud 1004 refers to any suitable data network or combination of data networks, which may include the Internet. Client machines located in the cloud 1004 may communicate with the on-demand database service environment 1000 to access services provided by the on-demand database service environment 1000. By way of example, client machines may access the on-demand database service environment 1000 to retrieve, store, edit, and/or process distributed denial of service attack and mitigation information.

In some implementations, the edge routers 1008 and 1012 route packets between the cloud 1004 and other components of the on-demand database service environment 1000. The edge routers 1008 and 1012 may employ the Border Gateway Protocol (BGP). The edge routers 1008 and 1012 may maintain a table of IP networks or 'prefixes', which designate network reachability among autonomous systems on the internet.

In one or more implementations, the firewall 1016 may protect the inner components of the environment 1000 from internet traffic. The firewall 1016 may block, permit, or deny access to the inner components of the on-demand database service environment 1000 based upon a set of rules and/or other criteria. The firewall 1016 may act as one or more of a packet filter, an application gateway, a stateful filter, a proxy server, or any other type of firewall.

In some implementations, the core switches 1020 and 1024 may be high-capacity switches that transfer packets within the environment 1000. The core switches 1020 and 1024 may be configured as network bridges that quickly route data between different components within the on-demand database service environment. The use of two or more core switches 1020 and 1024 may provide redundancy and/or reduced latency.

In some implementations, communication between the pods 1040 and 1044 may be conducted via the pod switches 1032 and 1036. The pod switches 1032 and 1036 may facilitate communication between the pods 1040 and 1044 and client machines, for example via core switches 1020 and 1024. Also or alternatively, the pod switches 1032 and 1036 may facilitate communication between the pods 1040 and 1044 and the database storage 1056. The load balancer 1028 may distribute workload between the pods, which may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048, which may act as a computer application firewall operating at the database application layer of a protocol stack. The database firewall 1048 may protect the database storage 1056 from application attacks such as structure query language (SQL) injection, database rootkits, and unauthorized information disclosure. The database firewall 1048 may include a host using one or more forms of reverse proxy services to proxy traffic before passing it to a gateway router and/or may inspect the contents of database traffic and block certain content or database requests. The database firewall 1048 may work on the SQL application level atop the TCP/IP stack, managing applications' connection to the database or SQL management interfaces as well as intercepting and enforcing packets traveling to or from a database network or application interface.

In some implementations, the database storage 1056 may be an on-demand database system shared by many different organizations. The on-demand database service may employ a single-tenant approach, a multi-tenant approach, a virtualized approach, or any other type of database approach. Communication with the database storage 1056 may be conducted via the database switch 1052. The database storage 1056 may include various software components for handling database queries. Accordingly, the database switch 1052 may direct database queries transmitted by other components of the environment (e.g., the pods 1040 and 1044) to the correct components within the database storage 1056.

Figure 10B:
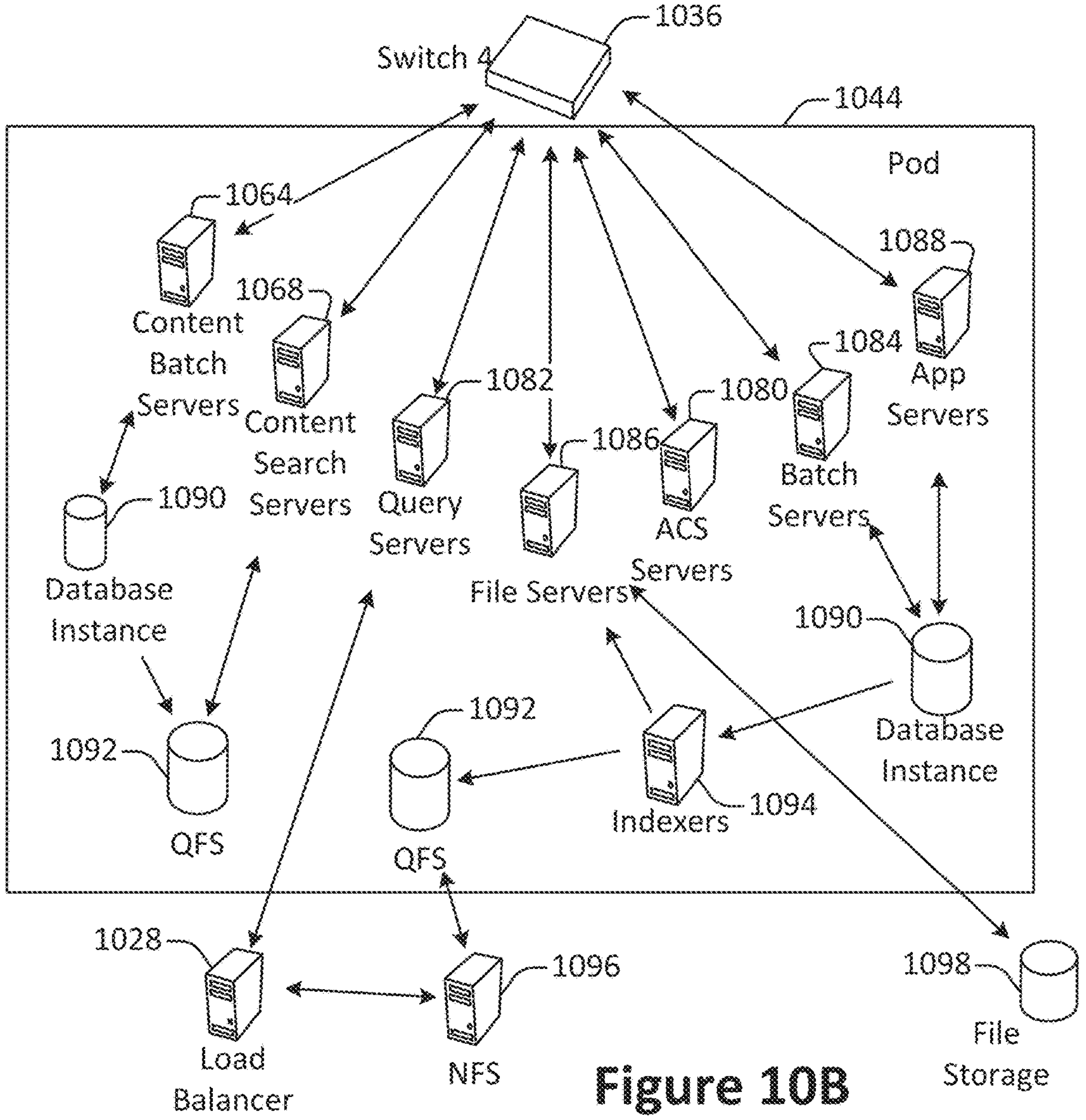
FIG. 10B shows a system diagram further illustrating an example of architectural components of an on-demand database service environment, in accordance with some implementations.

FIG. 10B shows a system diagram further illustrating an example of architectural components of an on-demand database service environment, in accordance with some implementations. The pod 1044 may be used to render services to user(s) of the on-demand database service environment 1000. The pod 1044 may include one or more content batch servers 1064, content search servers 1068, query servers 1082, file servers 1086, access control system (ACS) servers 1080, batch servers 1084, and app servers 1088. Also, the pod 1044 may include database instances 1090, quick file systems (QFS) 1092, and indexers 1094. Some or all communication between the servers in the pod 1044 may be transmitted via the switch 1036.

In some implementations, the app servers 1088 may include a framework dedicated to the execution of procedures (e.g., programs, routines, scripts) for supporting the construction of applications provided by the on-demand database service environment 1000 via the pod 1044. One or more instances of the app server 1088 may be configured to execute all or a portion of the operations of the services described herein.

In some implementations, as discussed above, the pod 1044 may include one or more database instances 1090. A database instance 1090 may be configured as an MTS in which different organizations share access to the same database, using the techniques described above. Database information may be transmitted to the indexer 1094, which may provide an index of information available in the database 1090 to file servers 1086. The QFS 1092 or other suitable filesystem may serve as a rapid-access file system for storing and accessing information available within the pod 1044. The QFS 1092 may support volume management capabilities, allowing many disks to be grouped together into a file system. The QFS 1092 may communicate with the database instances 1090, content search servers 1068 and/or indexers 1094 to identify, retrieve, move, and/or update data stored in the network file systems (NFS) 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information over a network in a manner similar to how local storage is accessed. Queries from the query servers 1022 may be transmitted to the NFS 1096 via the load balancer 1028, which may distribute resource requests over various resources available in the on-demand database service environment 1000. The NFS 1096 may also communicate with the QFS 1092 to update the information stored on the NFS 1096 and/or to provide information to the QFS 1092 for use by servers located within the pod 1044.

In some implementations, the content batch servers 1064 may handle requests internal to the pod 1044. These requests may be long-running and/or not tied to a particular customer, such as requests related to log mining, cleanup work, and maintenance tasks. The content search servers 1068 may provide query and indexer functions such as functions allowing users to search through content stored in the on-demand database service environment 1000. The file servers 1086 may manage requests for information stored in the file storage 1098, which may store information such as documents, images, basic large objects (BLOBs), etc. The query servers 1082 may be used to retrieve information from one or more file systems. For example, the query system 1082 may receive requests for information from the app servers 1088 and then transmit information queries to the NFS 1096 located outside the pod 1044. The ACS servers 1080 may control access to data, hardware resources, or software resources called upon to render services provided by the pod 1044. The batch servers 1084 may process batch jobs, which are used to run tasks at specified times. Thus, the batch servers 1084 may transmit instructions to other servers, such as the app servers 1088, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 11:
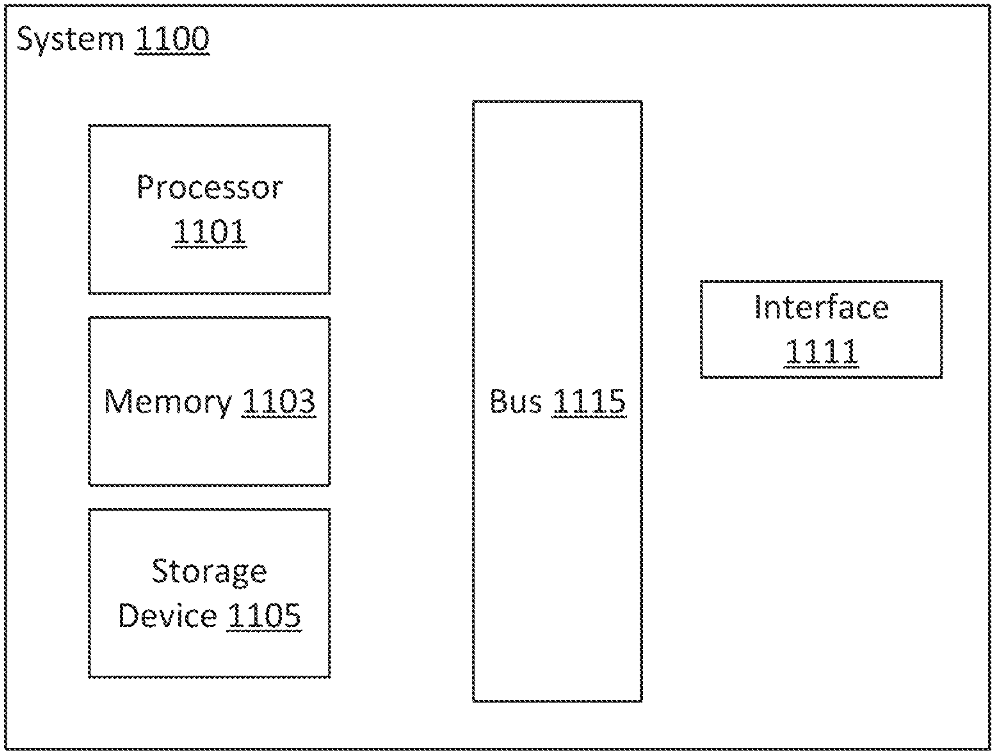
FIG. 11 illustrates one example of a computing device, configured in accordance with one or more embodiments.

FIG. 11 illustrates one example of a computing device. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as variety of devices such as an application server, a database server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of application-level distributed denial of service attacks. However, the techniques disclosed herein apply to a wide variety of malicious network activity. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing services environment providing computing services to a plurality of recipients via the Internet, the computing services environment comprising:

a plurality of web servers providing access to a plurality of domains on behalf of the plurality of recipients;

a plurality of network ingress paths receiving a plurality of application-layer request messages, each of the plurality of application-layer request messages being received from a respective source of a plurality of sources via a respective ingress path of the plurality of network ingress paths and being directed to a respective domain of the plurality of domains;

an orchestration engine including one or more processors configured to:

determine a probability that a spike in domain-specific network traffic corresponds to an application-layer distributed denial of service attack for a designated domain, and upon determining that the probability surpasses a designated threshold:

classify individual sources among the plurality of sources based on application-layer characteristics of a subset of the plurality of application-layer request messages directed to the designated domain, the individual sources including a first source classified as associated with malicious behavior and a second source classified as potentially associated with the application-layer distributed denial of service attack, determine a plurality of domain-specific application-layer mitigation policies indicating for each of a plurality of source-domain-ingress path combinations whether to restrict subsequent communication from a respective source to the designated domain through a respective network ingress path, and generate, from the classifications of the individual sources and the determinations for the plurality of source-domain-ingress path combinations, the plurality of domain-specific application-layer mitigation policies including: (i) a blocked-source list identifying the first source and corresponding to a first rule configured to block subsequent application-layer request messages from the first source from reaching the designated domain via a first network ingress path, and (ii) an updated rate-limiting plan identifying the second source and corresponding to a second rule configured to throttle subsequent application-layer request messages from the second source to the designated domain via a second network ingress path;

a generative language model interface configured to generate a report characterizing the application-layer distributed denial of service attack and the plurality of domain-specific application-layer mitigation policies, wherein the orchestration engine is further configured to identify a recipient of the plurality of recipients that is likely affected by the application-layer distributed denial of service attack and to transmit the report to the recipient; and one or more network controllers configured to implement one or more instructions characterizing the plurality of domain-specific application-layer mitigation policies received from the orchestration engine.

2. The computing services environment recited in claim 1, wherein the plurality of domain-specific application-layer mitigation policies are determined when a traffic level associated with a portion of the computing services environment exceeds a traffic threshold.

3. The computing services environment recited in claim 1, wherein the application-layer distributed denial of service attack is limited to a subset of the plurality of domains and a subset of the plurality of network ingress paths.

4. The computing services environment recited in claim 1, wherein the probability is determined based at least in part on historical network traffic data associated with one or more domains of the plurality of domains.

5. A method implemented at an orchestration engine in a computing services environment providing computing services to a plurality of recipients via the Internet, the method comprising:

identifying a plurality of application-layer request messages received at the computing services environment, each of the plurality of application-layer request messages being received from a respective source of a plurality of sources via a respective ingress path of a plurality of network ingress paths and being directed to a respective domain of a plurality of domains accessible via the computing services environment;

determining a probability that a spike in domain-specific network traffic corresponds to an application-layer distributed denial of service attack for a designated domain;

upon determining that the probability surpasses a designated threshold:

classifying individual sources among the plurality of sources based on application-layer characteristics of a subset of the plurality of application-layer request messages directed to the designated domain, the individual sources including a first source classified as associated with malicious behavior and a second source classified as potentially associated with the application-layer distributed denial of service attack, determining via a processor a plurality of domain-specific mitigation policies indicating for each of a plurality of source-domain-ingress path combinations whether to restrict subsequent communication from a respective source to the designated domain through a respective network ingress path, generating, from the classifications of the individual sources and the determinations for the plurality of source-domain-ingress path combinations, the plurality of domain-specific application-layer mitigation policies including: (i) a blocked-source list identifying the first source and corresponding to a first rule configured to block subsequent application-layer request messages from the first source from reaching the designated domain via a first network ingress path, and (ii) an updated rate-limiting plan identifying the second source and corresponding to a second rule configured to throttle subsequent application-layer request messages from the second source to the designated domain via a second network ingress path, and generating a report characterizing the application-layer distributed denial of service attack and the plurality of domain-specific application-layer mitigation policies via a generative language model interface, wherein the orchestration engine is further configured to identify a recipient of the plurality of recipients that is likely affected by the application-layer distributed denial of service attack and to transmit the report to the recipient; and transmitting one or more instructions to implement the plurality of domain-specific application-layer mitigation policies to one or more controllers via a communication interface.

6. The method recited in claim 5, wherein the application-layer distributed denial of service attack is limited to a subset of the plurality of domains and a subset of the plurality of network ingress paths.

7. The method recited in claim 5, wherein the probability is determined based at least in part on historical network traffic data associated with one or more domains of the plurality of domains.

8. One or more non-transitory computer readable media having instructions stored thereon for performing a method implemented at an orchestration engine in a computing services environment providing computing services to a plurality of recipients via the Internet, the method comprising:

identifying a plurality of application-layer request messages received at the computing services environment, each of the plurality of application-layer request messages being received from a respective source of a plurality of sources via a respective ingress path of a plurality of network ingress paths and being directed to a respective domain of a plurality of domains accessible via the computing services environment;

determining a probability that a spike in domain-specific network traffic corresponds to an application-layer distributed denial of service attack for a designated domain;

upon determining that the probability surpasses a designated threshold:

classifying individual sources among the plurality of sources based on application-layer characteristics of a subset of the plurality of application-layer request messages directed to the designated domain, the individual sources including a first source classified as associated with malicious behavior and a second source classified as potentially associated with the application-layer distributed denial of service attack, determining via a processor a plurality of domain-specific mitigation policies indicating for each of a plurality of source-domain-ingress path combinations whether to restrict subsequent communication from a respective source to the designated domain through a respective network ingress path, generating, from the classifications of the individual sources and the determinations for the plurality of source-domain-ingress path combinations, the plurality of domain-specific application-layer mitigation policies including: (i) a blocked-source list identifying the first source and corresponding to a first rule configured to block subsequent application-layer request messages from the first source from reaching the designated domain via a first network ingress path, and (ii) an updated rate-limiting plan identifying the second source and corresponding to a second rule configured to throttle subsequent application-layer request messages from the second source to the designated domain via a second network ingress path, and generating a report characterizing the application-layer distributed denial of service attack and the plurality of domain-specific application-layer mitigation policies via a generative language model interface, wherein the orchestration engine is further configured to identify a recipient of the plurality of recipients that is likely affected by the application-layer distributed denial of service attack and to transmit the report to the recipient; and transmitting one or more instructions to implement the plurality of domain-specific application-layer mitigation policies to one or more controllers via a communication interface.

9. The one or more non-transitory computer readable media recited in claim 8, wherein the application-layer distributed denial of service attack is limited to a subset of the plurality of domains and a subset of the plurality of network ingress paths.

10. The one or more non-transitory computer readable media recited in claim 8, wherein the probability is determined based at least in part on historical network traffic data associated with one or more domains of the plurality of domains.

* * * * *